US009436558B1

(12) United States Patent
Per et al.

(10) Patent No.: US 9,436,558 B1
(45) Date of Patent: Sep. 6, 2016

(54) SYSTEM AND METHOD FOR FAST BACKUP AND RESTORING USING SORTED HASHES

(75) Inventors: Yuri S. Per, Moscow (RU); Maxim V. Lyadvinsky, Moscow (RU); Serguei M. Beloussov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 841 days.

(21) Appl. No.: 12/974,753

(22) Filed: Dec. 21, 2010

(51) Int. Cl.
*G06F 12/02* (2006.01)
*G06F 11/14* (2006.01)

(52) U.S. Cl.
CPC .................. *G06F 11/1451* (2013.01)

(58) Field of Classification Search
None
See application file for complete search history.

(56) References Cited

U.S. PATENT DOCUMENTS

| | | | |
|---|---|---|---|
| 3,380,029 A | 4/1968 | Goetz | |
| 4,922,417 A | 5/1990 | Churm et al. | |
| 5,210,870 A | 5/1993 | Baum et al. | |
| 5,287,499 A | 2/1994 | Nemes | |
| 5,377,354 A | 12/1994 | Scannell et al. | |
| 5,396,622 A | 3/1995 | Lee et al. | |
| 5,511,190 A | 4/1996 | Sharma et al. | |
| 5,610,603 A | 3/1997 | Plambeck | |
| 5,757,795 A * | 5/1998 | Schnell .......................... 370/392 |
| 7,636,824 B1 * | 12/2009 | Tormasov ..................... 711/162 |
| 7,930,559 B1 * | 4/2011 | Beaverson et al. ............ 713/193 |
| 8,024,719 B2 | 9/2011 | Gorton, Jr. | |
| 8,108,437 B2 | 1/2012 | Helfman | |
| 8,185,459 B2 * | 5/2012 | Wall et al. ....................... 705/35 |
| 2005/0204262 A1 * | 9/2005 | Berens et al. ................. 714/755 |
| 2006/0227621 A1 * | 10/2006 | Kasai .................. G11C 29/838 365/185.29 |
| 2007/0250671 A1 * | 10/2007 | Lyon .............................. 711/162 |
| 2007/0255999 A1 * | 11/2007 | Risse .................. G06F 11/1044 714/766 |
| 2010/0293206 A1 * | 11/2010 | Ylonen ......................... 707/813 |
| 2011/0307457 A1 * | 12/2011 | Ishii .................. G06F 17/30283 707/692 |
| 2012/0011101 A1 * | 1/2012 | Fang et al. .................... 707/654 |

OTHER PUBLICATIONS

Blelloch, Guy E., et al., "Strongly History-Independent Hashing with Applications," Foundations of Computer Science, 2007. FOCS '07. 48th Annual IEEE Symposium on Oct. 21-23, 2007, pp. 272-282.
Faloutsos, C., "15-826: Multimedia Databases and Data Mining," 2005, 18 pages.
Kim, Changkyu, et al., "Sort vs. Hash Revisited: Fast Join Implementation on Modern Multi-Core CPUs," VLDB '09, Aug. 24-28, 2009, pp. 1-12.
Litwin, Witold, "Linear Hashing: A New Tool for File and Table Addressing," 1980 IEEE, pp. 212-223.

* cited by examiner

*Primary Examiner* — Charles Rones
*Assistant Examiner* — Ryan Dare
(74) *Attorney, Agent, or Firm* — Fish & Richardson P.C.

(57) ABSTRACT

A method, system and computer program product for backup and restoration of data. Hash values for data blocks subject to backup are generated. After a number of hashes are accumulated, e.g., on a backup server, these hashes are sorted. Then, the hashes are compared against the hash values in the hash table corresponding to data blocks that have already been backed up. If a hash matches the hash from the hash table, a pointer to the block in the archive is written to the table of pointers to the redundant blocks. Then, this hash value is deleted from a set of the hash values. A check is made if a hash is the last in the group. If the hash is the last in the group, the remaining unique hash values are written into the hash table. Otherwise, the next hash is selected from the group. The redundant data blocks are discarded and only unique data is backed up.

14 Claims, 11 Drawing Sheets

SYSTEM AND METHOD FOR FAST BACKUP AND RESTORING USING SORTED HASHES

BACKGROUND OF THE INVENTION

1. Field of the Invention

The present invention relates to data backups, and, more particularly, to optimizing backup and restoration of data using sorted hashes.

2. Description of the Related Art

Currently, there are a number of conventional methods for organization of data archiving. One of these methods is a backup of the entire hard drive, which typically involves copying of the hard drive content onto some other medium, such as another hard disk drive, a RAID, a DVD ROM, a DVD RAM, a flash disk, etc.

The primary disadvantage of such methods is the need to backup what is frequently a very large amount of data, which, on the one hand, results in a relatively lengthy process of archiving, and, on the other hand, often requires relatively large volume of available space for the archived data. This ultimately results in a high cost of archiving per unit of archived data.

Typically, when one computer system is backed up, a full backup of data is performed at first, and then only incremental backups are implemented. Alternatively, a differential backup can be done after the initial full backup. This can significantly reduce a volume of used space on a backup storage.

However, when two or more computer systems are backed up to the backup storage, there is a high probability that same data from different computers is repeatedly backed up. Typically, redundant data blocks are eliminated by de-duplication. De-duplication optimizes backup and restoration of data.

The data that is a subject to backup is separated into data blocks (or segments). Then a hash value is calculated for each data block. The data block hash is compared against a hash table containing the hash values of already stored data blocks. If a matching hash value is found in the table, only a reference to the data block or the data block identifier is saved.

A number of methods for storage, search and deletion of data from the hash table are used. The conventional methods of hashing data for searching data in the external memory are directed to reducing a number of calls to the hash table that cause a significant overhead (and associated costs). The overhead is created when different areas of the data storage or different data storages are accessed (for example, different areas of the hard disk). Specifically, this happens if the data referenced in the hash table is stored on different data storages.

One of the conventional hash methods is Extendible Hashing based on search trees in the main memory. Extendible Hashing works well when record sets of the stored file change dynamically. However, a search (reference) tree needs to be created in the main memory.

Linear Hashing is a particular method of Extendible Hashing that can be effectively used for dynamically changing records. Detailed description of Linear Hashing is described in http:**www.cs.cmu.edu/afs/cs.cmu.edu/user/christos/www/courses/826-resources/PAPERS+BOOK/linear-hashing.PDF, incorporated herein by reference in its entirety.

Linear Hashing uses a dynamic hash table algorithm based on a special address scheme. A block of external memory is addressed using "junior" bits of the hash value. If splitting of the data blocks is required, the records are redistributed among the data blocks in such a manner that the address scheme remains correct.

The hash tables are conventionally used for data backup. However, the use of hash tables in the data backups has a problem of the hash values being dispersed throughout the hash table. When the backed up data is restored, the process can be slowed down by data hashes from one or several computer systems located in different parts of the data storage (or on different data storages). Also, the hash values can be located far from each other within the hash table.

Furthermore, adding hash values into the hash table is very ineffective, because the data blocks referenced by different parts of the hash table can be located next to each other on the backup storage. Storing hash values by groups is more effective. Then, neighboring data blocks (or segments) on the data storage will have neighboring corresponding hash values in the hash table.

Accordingly, there is a need in the art for a method and system for effective storage of data on backup storages that excludes storage of redundant data and optimizes storage of hash values in the hash table.

SUMMARY OF THE INVENTION

The present invention relates to method and system for optimizing backup and restoration of data using sorted hashes that substantially obviates one or several of the disadvantages of the related art.

The method includes generating hash values for data blocks subject to backup. After a number of hashes are accumulated on a backup server, these hashes are sorted. Then, the hashes are compared against the hash values corresponding to data blocks that have already been backed up in the hash table. If a hash matches the hash from the hash table, a pointer to the block in the archive is written to the table of pointers to the redundant blocks.

Then, this hash value is deleted from a set of the hash values. A system checks if the hash is the last in the group. If the hash is the last in the group, the remaining unique hash values are written into the hash table. Otherwise the next hash is selected from the group. The redundant data blocks are discarded and only unique data is backed up.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
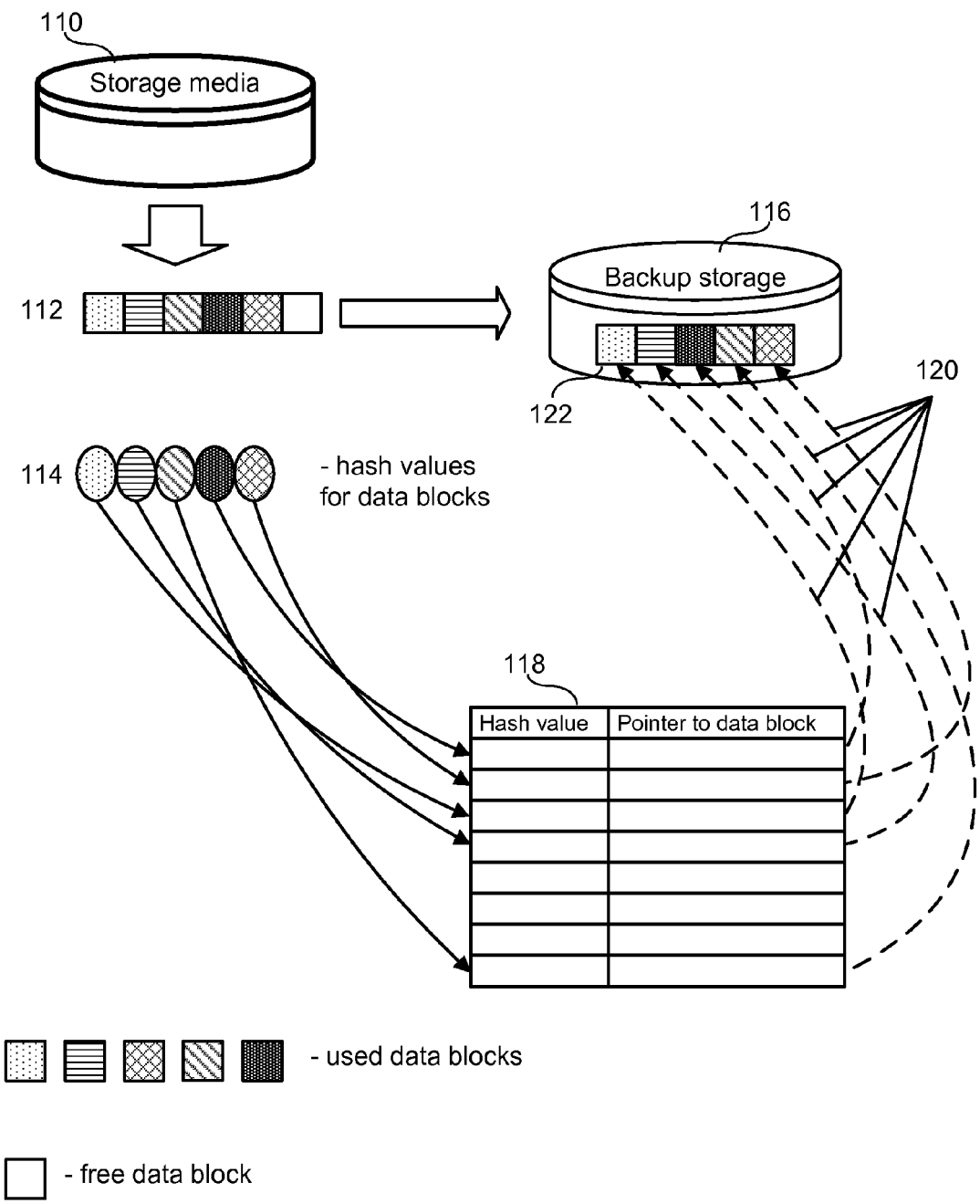
FIG. 1 illustrates an exemplary hashing scheme where a hash-table is filled up during data backup.

Reference will now be made in detail to embodiments of the present invention, examples of which are illustrated in the accompanying drawings.

A utility for backing up data is described. The utility works on a data block level, where "blocks" can refer to some basic units of storage space on a disk, such as disk sectors, or clusters or similar aggregates of sub-units. Also a "block" can refer to part of a file(s) or part of data, which can be transferred between or inside computer system's data storage media.

In some embodiments, a "block" for hash calculation may be defined as a chain of clusters or other sub-units. In other words, "blocks" are basic data units defined either by a hardware (e.g., sectors), by software (e.g., clusters or part of at least one file), or by the backup application (e.g., chains).

It should be understood that although the term "data storage" is used for description of a hard drive, the actual storage media at issue does not need to be an entire disk drive (or even a disk drive as such). It can be a logical drive, a flash drive, a partition of a disk drive assigned to a particular computer system, or a partition assigned to a particular virtual computer system (or a virtual machine). It can also be a network drive or a portion of a network drive, or it can be a distributed storage system that acts as a single logical drive.

The relevant point is that from the perspective of an operating system, a device exists and acts analogously to a hard disk drive or drive partition that can be accessed using operating system mechanisms that access storage devices and appropriate device drivers. When a data block is stored, a hash of the data block is written into a hash table with a pointer referring to a location of this data block (i.e., for example, a location on a backup storage).

A dynamic hash function generates n-bit binary numbers, where n usually equals to 32. The main principle of dynamic hashing is representing a number generated by hash function as a sequence of bits and placing this sequence within segments based on a particular interpretation.

The exemplary embodiment employs dynamic hashing in a form of extended hashing. In the extended hashing, records are continuously added to a first segment until it is completely filled up. At this point, the segment is split into 2i new segments, where 0<i<n (typically i=1, which means that the segment is split into two new segments). Segment addresses are stored in a catalog—an address table of segments.

According to the exemplary embodiment, the address of the segment dedicated to storing data having hash value P is stored in a K-cell of the catalog, where K is a decimal number corresponding to the binary number derived from the most significant i bits of the binary number P. After the segments are split, the data previously stored in them is relocated into new segments.

Once the new segment is filled up, the split operation is repeated. Then the catalog contains more addresses of the new segments that store values determined by a larger number of most significant bits of the hash value.

If data is deleted and the segment becomes empty, it can be deleted with its catalog pointer. In one embodiment, small segments can be combined and the catalog can be reduced by half in size. A pointer and a hash value can be referred to as key-value pairs. The key-value pairs are stored in an array of key-value lists. The key-value lists are often called "buckets." The array index is often referred to as the "bucket address."

In a sorted linear hash table, the bucket array size is always identical to the number of entries in the hash table. Therefore, the average number of entries per bucket is expected to be 1. Each insertion causes an addition of one new bucket at the end of the array. Similarly each deletion causes one bucket to be removed at the end of the array.

According to the exemplary embodiment, the bucket array consists of two partitions—the front partition and the expansion partition. The size of the front partition is always powers of 2. Some valid front partition sizes are 0, 1, 2, 4, 8, 16, etc. If a hash table has 7 entries, the front partition size would be 4 and the expansion partition size would be 3.

FIG. 1 illustrates an exemplary hashing scheme where a hash-table is filled up during data backup. Data blocks 112 located on a storage media 110 are subject to backup. Hash values 114 are calculated for the data blocks 112 using, for example, common hash algorithms such as MD4, MD5, CRC, CRC32, SHA1, SHA2, SHA256, SHA512, Russian national standard GOST R 34.11-94 "Information Technology—Cryptographic Information Security—Hash Function" (incorporated herein by reference), an equivalent standard used by other member-states of the CIS, GOST 34.311-95 (incorporated herein by reference), hash function based on block ciphers and Message Authentication Code (MAC), etc. Note that other one-way functions can be used, such that the value produced by the function (i.e., for example, the hash value in the case of hash functions) is guaranteed to be unique for different data block. A hash table 118 contains the hash values corresponding to the data of the blocks 112 located on the storage media 110.

According to the exemplary embodiment, a map reflecting unique and duplicate data blocks can be created as described, for example, in U.S. patent application Ser. No. 11/757,442, entitled "System and Method for Efficient Backup Using Hashes."

In the map, values that correspond to the same blocks (i.e., 1 or 0 bits) have the same corresponding content of the hash table. Therefore, in this case, the map (which contains addresses of the blocks in the disk image, or some other indicator or a pointer to their location) refers to the backed up data blocks.

Typically, when hash tables are used, a backup storage 116 stores only unique data blocks. Note that the exemplary embodiment can be applied to any type of backups—full backups of one or several systems, hard disks, volumes, partitions etc. (of computer systems or Virtual Machines). It can also be used with incremental, differential and other backups.

For example, using pointers to blocks whose content is stored in previous backup sets requires permanent access to those sets. If the volume of sets that can be simultaneously accessed needs to be limited, then a set of predefined rules can be used for using redirection pointers in incremental backups. For example, an earliest backup set in which pointers are used can be defined.

If the block content is stored in an earlier backup, then the pointer is not used and contents of that block is saved in the current backup. This reduces the number of backup sets used simultaneously and improves performance during restoration from backup.

The criteria of defining the earliest backup set can be, e.g., the total amount of backup sets or the date of the earliest backup. Another advantage of the exemplary embodiment is the ability to free up storage space, if storage with a fixed size is used for backing up.

According to the exemplary embodiment, any type of a hash table employing any hashing technique can be used. For example, dynamic hashing, linear hashing or extendible hashing (depicted in FIG. 2) can be used.

In dynamic hashing, the hash function generates a so-called pseudo key, which is partly used for accessing an element. In other words, a sufficiently long bit sequence is generated for addressing all possible elements. Unlike static hashing where a very large table (stored in operating memory) is required, in dynamic hashing, a volume of used memory is proportional to a number of elements in a database.

Each record in the table is stored in a block ("bucket"). These blocks coincide with the physical blocks on a data storage media. If a block does not have any more space for writing a record, the block is divided into two, and a pointer to the two new blocks is placed instead of the original block.

Figure 2:
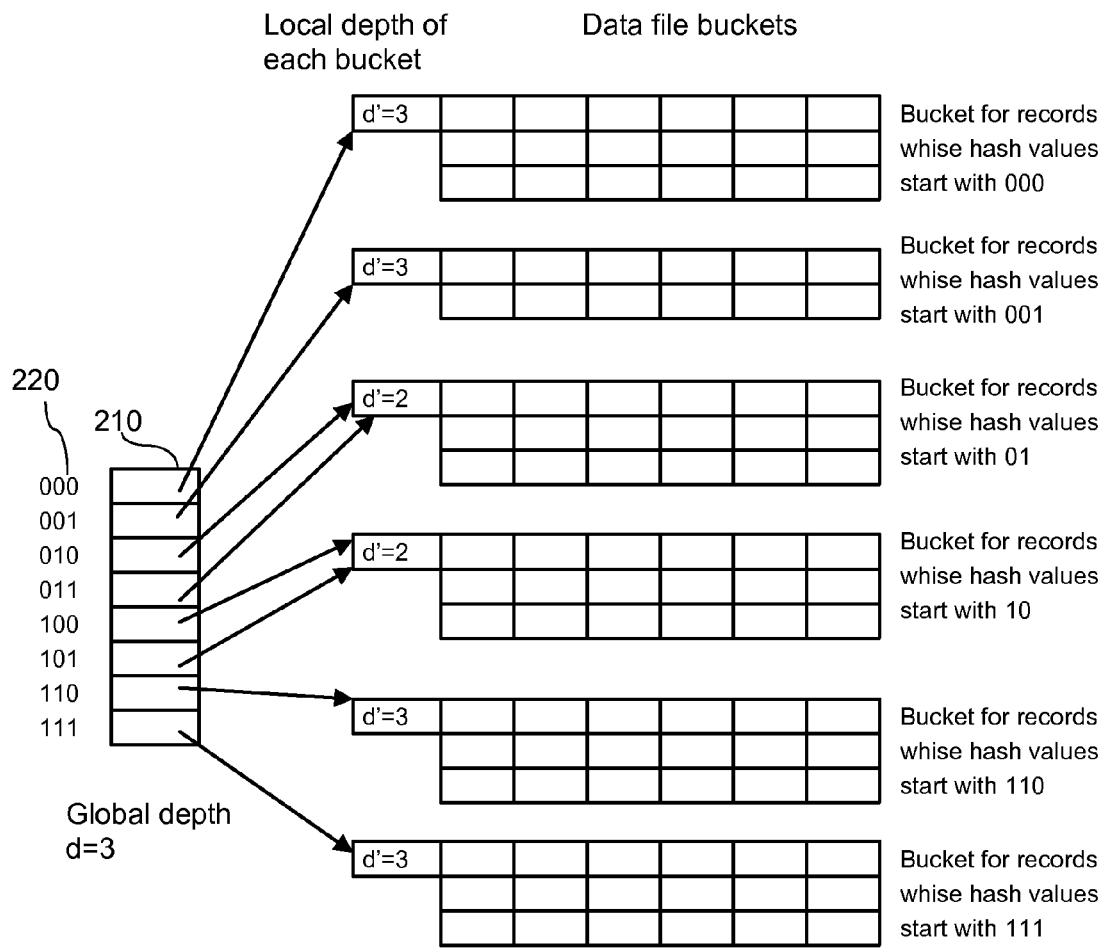
FIG. 2 illustrates a dynamic extendible hashing scheme, in accordance with the exemplary embodiment.

FIG. 2 illustrates an global-extendable hashing scheme, in accordance with the exemplary embodiment. Extendible hashing is similar to dynamic hashing. This method also uses blocks that change in size as a database grows, but it is compensated by optimizing the use of space. Since each time only one block is split up, the memory overhead is relatively small.

Extendible hashing uses a list of elements 210 that reference blocks, instead of a binary tree. The elements are addressed by a number of i bits of a pseudo key 220. When a search is performed, the i bits of the pseudo key 220 are used for finding an address of a required block via directory list 210. Adding elements is more complex. First, a procedure analogous to a search is performed. If the selected block is not filled up, a record is added into the block and into a database. If the block is filled up, it is split into two, and the records are redistributed.

In this case, a number of key bits 220 used for addressing can be increased. A size of the list is doubled, and each newly created element is assigned a pointer of its parent. Thus, it is possible to have several elements pointing to the same block. Note that during one insert operation values of no more than one block are recalculated. Deletion is performed by a reverse algorithm—i.e., the blocks are combined and the list 210 is reduced in half.

Figure 3:
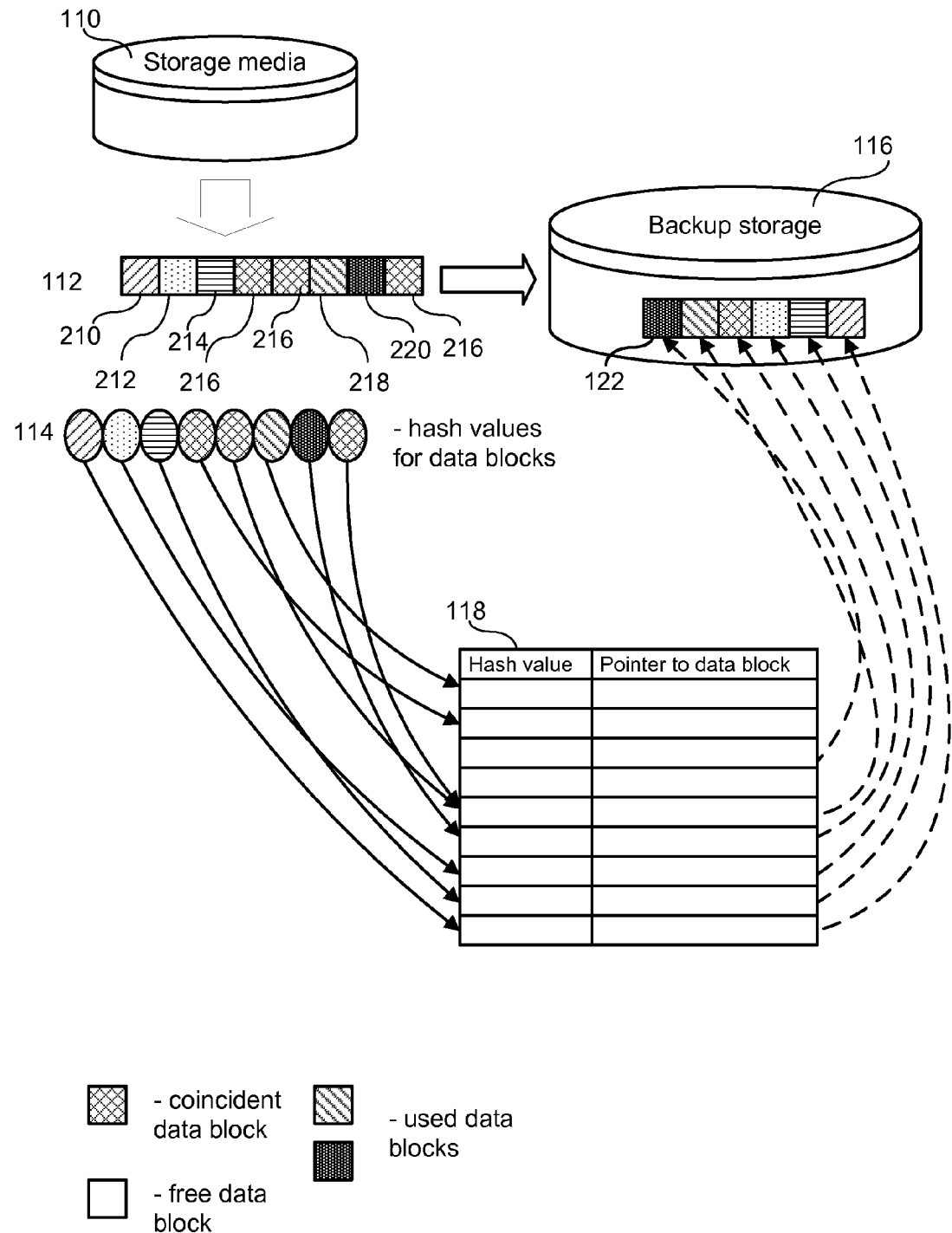
FIG. 3 illustrates a hashing scheme where a hash-table is filled up during backup of data having identical data blocks (i.e. hash values), in accordance with the exemplary embodiment.

FIG. 3 illustrates a hashing scheme where a hash-table is filled up during backup of data having identical data blocks (i.e. hash values), in accordance with the exemplary embodiment. Blocks 112 are located on a storage media 110. These blocks are subject to backup on a backup storage 116. Data blocks 210, 212, 214, 218 and 220 are unique and have corresponding unique hash values. Data blocks 216 are not unique since they have the same corresponding hash values (i.e., the blocks are the same).

The unique hash values are written into a hash table 118 and the unique data blocks 122 are written onto a backup storage 116 using a map, a table or a list reflecting the unique blocks 210, 212, 214, 218 and 220.

Figure 4:
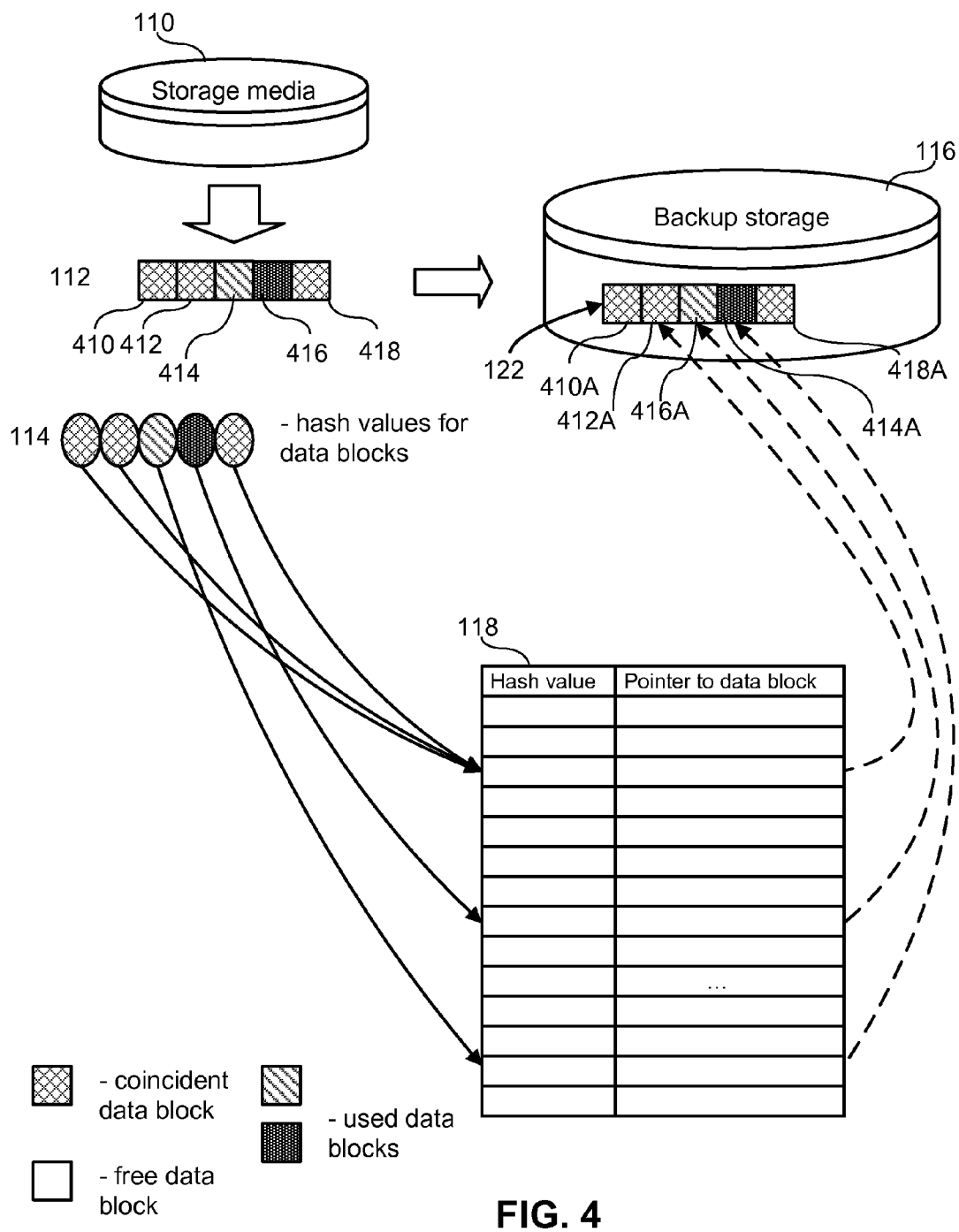
FIG. 4 illustrates a hashing scheme where a hash-table is filled up during backup of data having identical data blocks (i.e. hash values) where all data blocks, including the identical blocks, are written onto backup storage, in accordance with the exemplary embodiment.

FIG. 4 illustrates a hashing scheme where a hash-table is filled up during backup of data having identical data blocks (i.e. hash values) where all data blocks, including identical blocks, are written onto backup storage, in accordance with the exemplary embodiment. In this case, a hash table has only a pointer to any one block 412A out of the identical backed up blocks 410, 412 and 418 on the storage media 110 and the backed up blocks 410, 412 and 418 on the backup storage 116.

The redundant hash values are discarded. However, redundant location pointers (to the backed up data blocks) can be saved for future work with the redundant backed up data blocks such as 410A, 418A (i.e., for example, for subsequent deletion of these data blocks from the backup).

This method can be ineffective since the data blocks need to be sent to the backup storage via LAN, WLAN, Internet, etc. In other words, some data is backed up and not used. The backed up redundant data blocks take up some space on the backup storage 116.

This method can be effective, however, when a first backup is created (e.g., a full backup). In large enterprises a number of computers are networked. These computers can have different OSs and applications running on them based on requirements of a particular department. In this situation, a probability of finding identical data blocks (with the same hash values) on media storages (e.g., hard disks) is extremely small.

Thus, typically hash values are calculated and collected on a client side (i.e., for example, on a user computer having client backup application installed). Then, the hash values are provided to a server that has server backup application running on it. The received hash values are compared against the hash values from the hash table. The unique hash values are written into the hash table and the unique data blocks are written into the backup storage.

Note that the backup storage 116 can be located on a server (with a server backup application running on it) or it can be connected over network (e.g., LAN, WLAN, Internet, SAN, NAS, Ethernet, etc.). Alternatively the backup storage can be distributed over several disks, volumes or partitions of the client system.

Since the probability of finding identical data blocks (with the same hash values) on media storages of different users is extremely small, all data blocks from different client system can be transferred to the server side and backed up onto the backup storage 116 and the unique hash values can be stored in the hash table.

Figure 5:
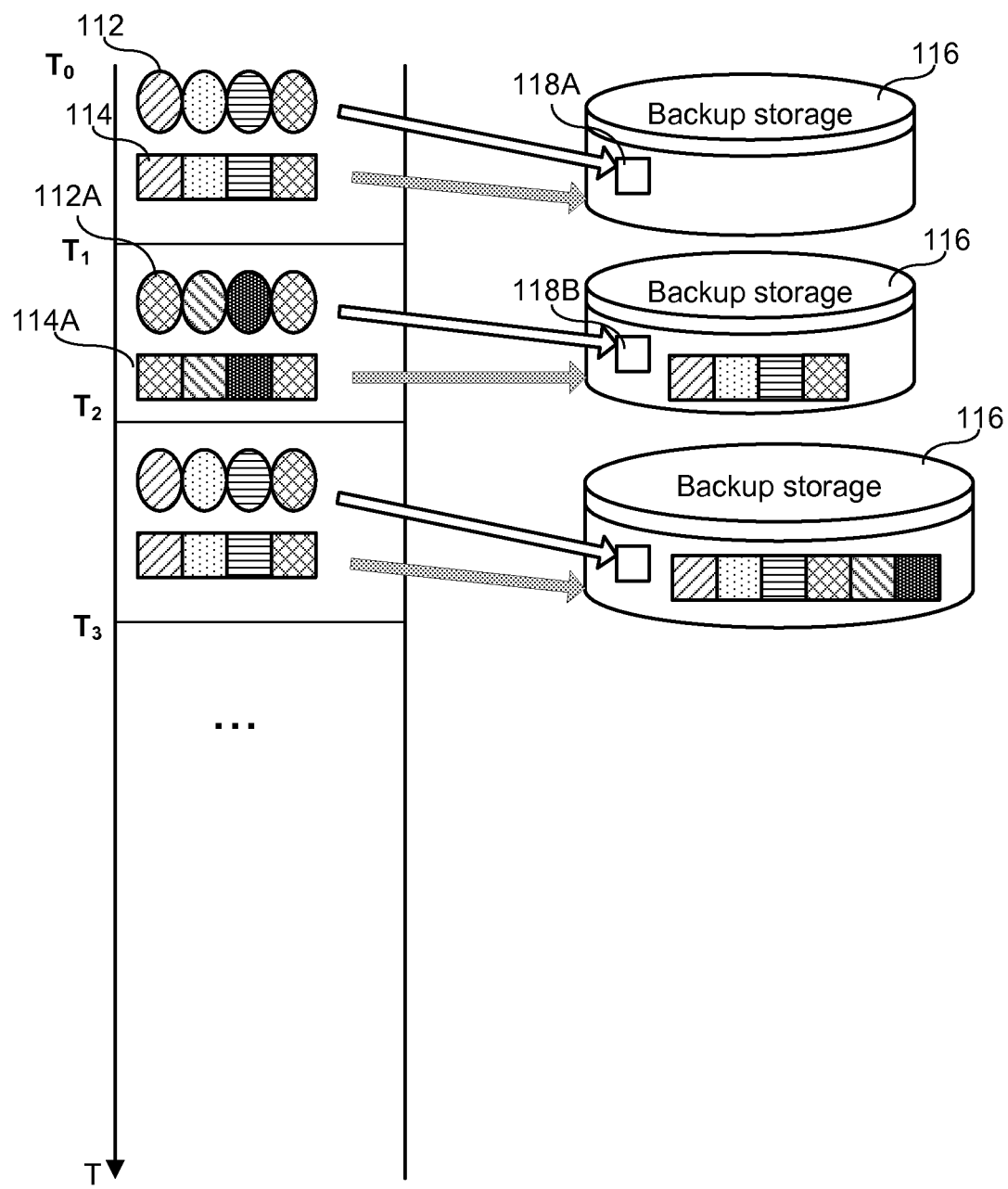
FIG. 5 illustrates a hashing scheme where a hash-table is filled up during backup of data having identical data blocks (i.e. hash values) over different time intervals, in accordance with the exemplary embodiment.

FIG. 5 illustrates a hashing scheme where a hash-table is filled up during backup of data having identical data blocks (i.e. hash values) over different time intervals, in accordance with the exemplary embodiment. From a time point $T_0$ to a moment $T_1$ a backup system can receive a command (request) for backup of the data blocks 114. After the backup command is received, the hash values 112 are calculated for the data blocks 114. If it is a first backup and the hash table is empty, the unique hash values are written into a hash table 118A and the data blocks 114 are backed up onto the backup storage 116.

If it is not a first backup, the backup storage already has backed up data blocks. The hash values are calculated for the data blocks 114. These hash values are compared against the hash values from the hash table. Then, the unique hash values are stored in the hash table and the data blocks are backed up onto the backup storage 116.

From the time $T_1$ until the moment $T_2$, the backup system can receive a request for backup of the data blocks 114A. After the request is received, the hash values 112A are calculated for the data blocks 114A. The data storage 116 already has some data from the previous backups and the hash table 118B has the hash values corresponding to the backed up data blocks. The hash values calculated for the data blocks 114A are compared against the hash values from the hash table 118B. The unique hash values (corresponding to the unique data blocks) are stored in the hash table, and the unique data blocks are backed up onto the backup storage 116.

Alternatively, the unique hash values are stored in the hash table and all data blocks are backed up as described above. In this case all data blocks are provided to the backup server and the hash values are calculated on the backup server. This approach can be used in combination with sorting of hashes. The sorting of hashes takes time that is sufficient for backup of at least one data block to the backup storage 116. If a large number of hashes is used, a number of the blocks backed up during the sorting of the hashes can increase dramatically.

Figure 6:
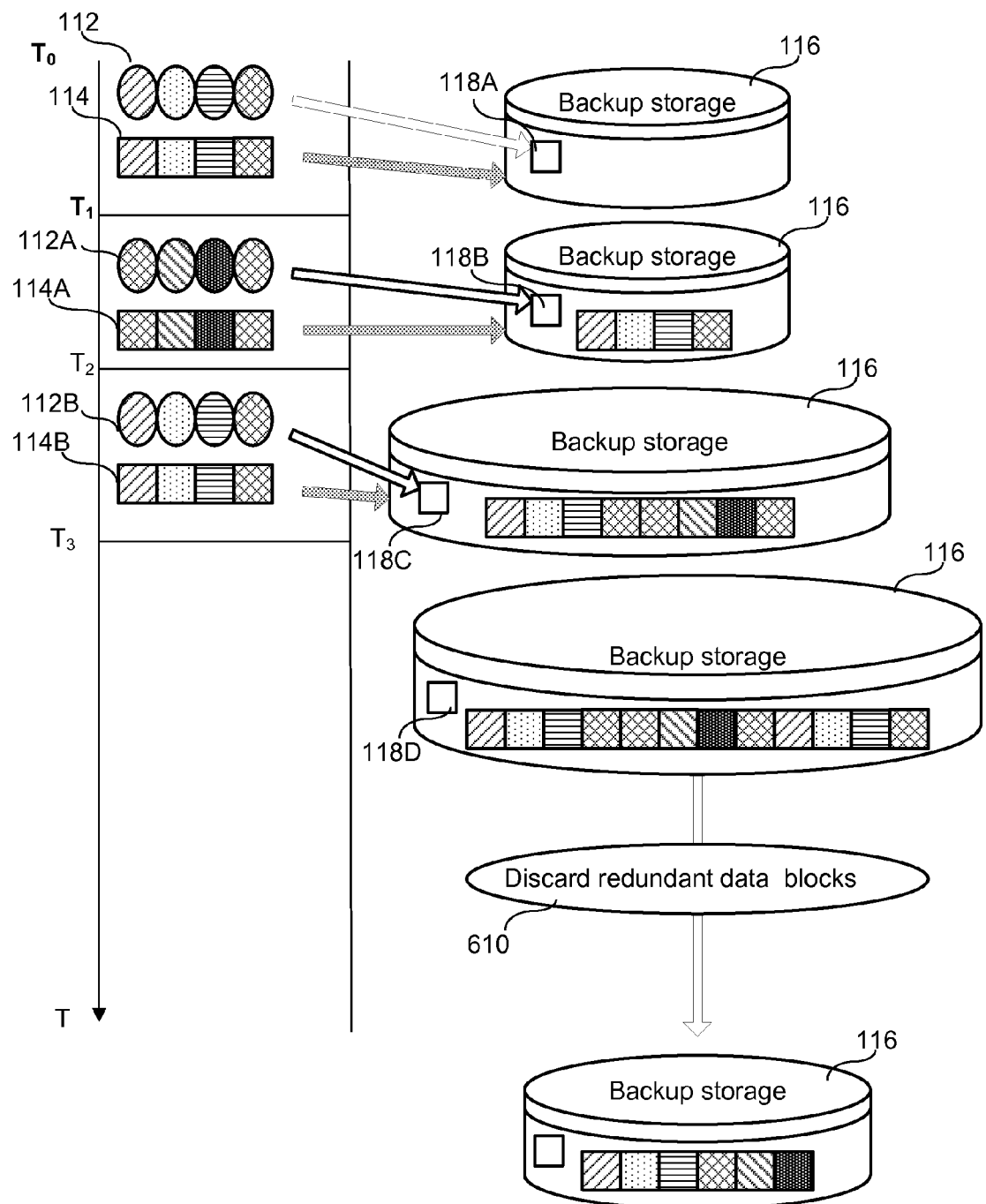
FIG. 6 illustrates a hashing scheme where a hash-table is filled up during backup of data having identical data blocks (i.e. hash values) over different time intervals with a subsequent deletion of the same data blocks, in accordance with the exemplary embodiment.

FIG. 6 illustrates a hashing scheme where a hash-table is filled up during backup of data having identical data blocks (i.e. hash values) over different time intervals with a subsequent deletion of the same data blocks, in accordance with the exemplary embodiment. At any given time identical backed up data blocks can be removed from the backup storage 116 by analyzing the hash table. If the hash table does not have a pointer to the backed up block, this block can be removed from the backup storage 116.

Figure 7:
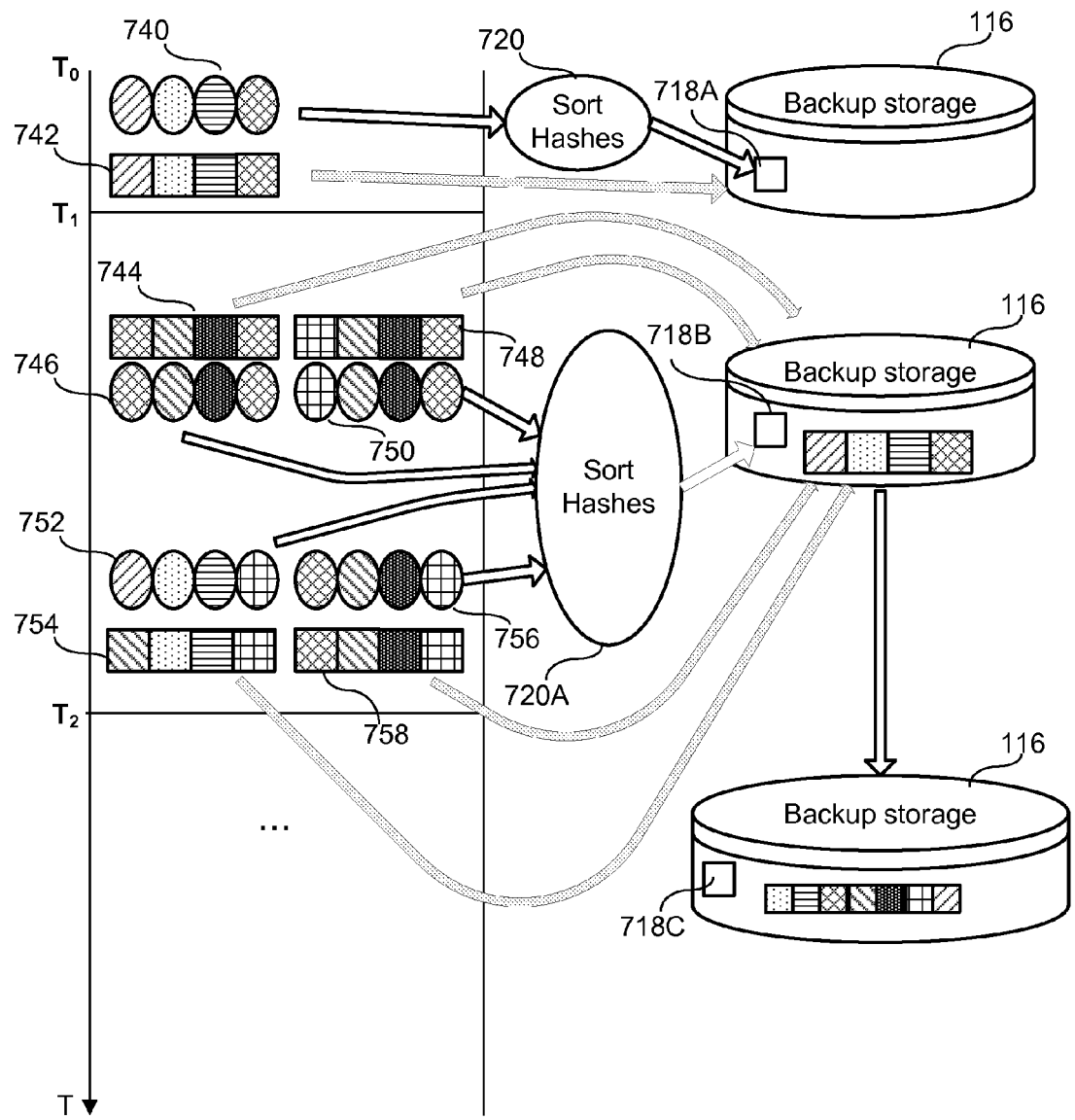
FIG. 7 illustrates a hashing scheme that uses sorting of hash values in a hash-table where the hash-table is filled up during backup of data having identical data blocks (i.e. hash values), in accordance with the exemplary embodiment.

FIG. 7 illustrates a hashing scheme that uses sorting of hash values in a hash-table where the hash-table is filled up during backup of data having identical data blocks (i.e. hash values), in accordance with the exemplary embodiment. FIG. 7 depicts a situation similar to the one shown in FIG. 5. However, in this case, the hash values 740, 746, 750, 752 and 756 calculated for the data blocks 742, 744, 748, 754 and 758 that are subject to backup, first sorted out (see 720 and 720A) and compared against the stored hash values for definition of uniqueness and then inserted into the hash tables 718, 718A, 718B, respectively.

Note that the calculated hash values 740, 746, 750, 752 and 756 for the data blocks 742, 744, 748, 754 and 758 (subject to back up) can be compared against the hash values corresponding to the previously backed up blocks and then sorted out.

In FIG. 7, from the point $T_1$ until the moment $T_2$ the backup system can receive a request for backup of the data blocks 744, 748, 754 and 758 that are located on different hard disks, different partitions or volumes, or different computer systems.

Note that writing hash values corresponding to data blocks with a pointer to the location of the data block on the backup storage takes up a long time, because moving the read/write head to different parts of data requires extra time (e.g., extra accessing of a hard disk).

Writing a large number of hash values with the block location pointers simultaneously takes less time. However, calculated hash values may need to be written into different parts of the hash table. Also, the data blocks can be located in the different partitions of the storage media or can be located on different storage media or volumes.

In order to avoid random read of hash values from the hash table and read of the data blocks from the backup storage, the hash values in the table need to be sorted according to a particular order. Efficient restoration of the backup media (i.e., reading the values from the hash table) needs to be optimized. Reading of the data blocks from the backup storage and writing the data blocks onto the storage media needs to be optimized as well.

According to the exemplary embodiment, writing the hash values into the hash table is optimized by sorting the hash values prior to writing them into the hash table. In order to avoid random access to the disk, the hash files are sorted based on their addresses. An address of a record in the linear hash file, unlike static hash table, is not fixed. The address changes based on added or delete records.

In case of linear hashing, several hash functions are used. Thus, sorting records based on hash values does not solve an optimization problem of writing the records into a hash table. Prior to writing to a bucket, all records belonging to the bucket have to be grouped.

An optimal order of records can be achieved by loading records into a hash file in such a way that it does not cause splitting of the buckets or relocating records within the hash table. In order to avoid splitting of the buckets and relocation of the records, a distribution of records over particular buckets has to be pre-determined prior to writing data (including the data block location pointers).

A number of buckets can be calculated for a hash table (hash file). An address of a destination bucket (i.e., the bucket where the record needs to be stored) can be calculated based on a number of least significant bits of the hash value. At the point where the bucket splits, a number of bits used for addressing are reduced by one.

Figure 8:
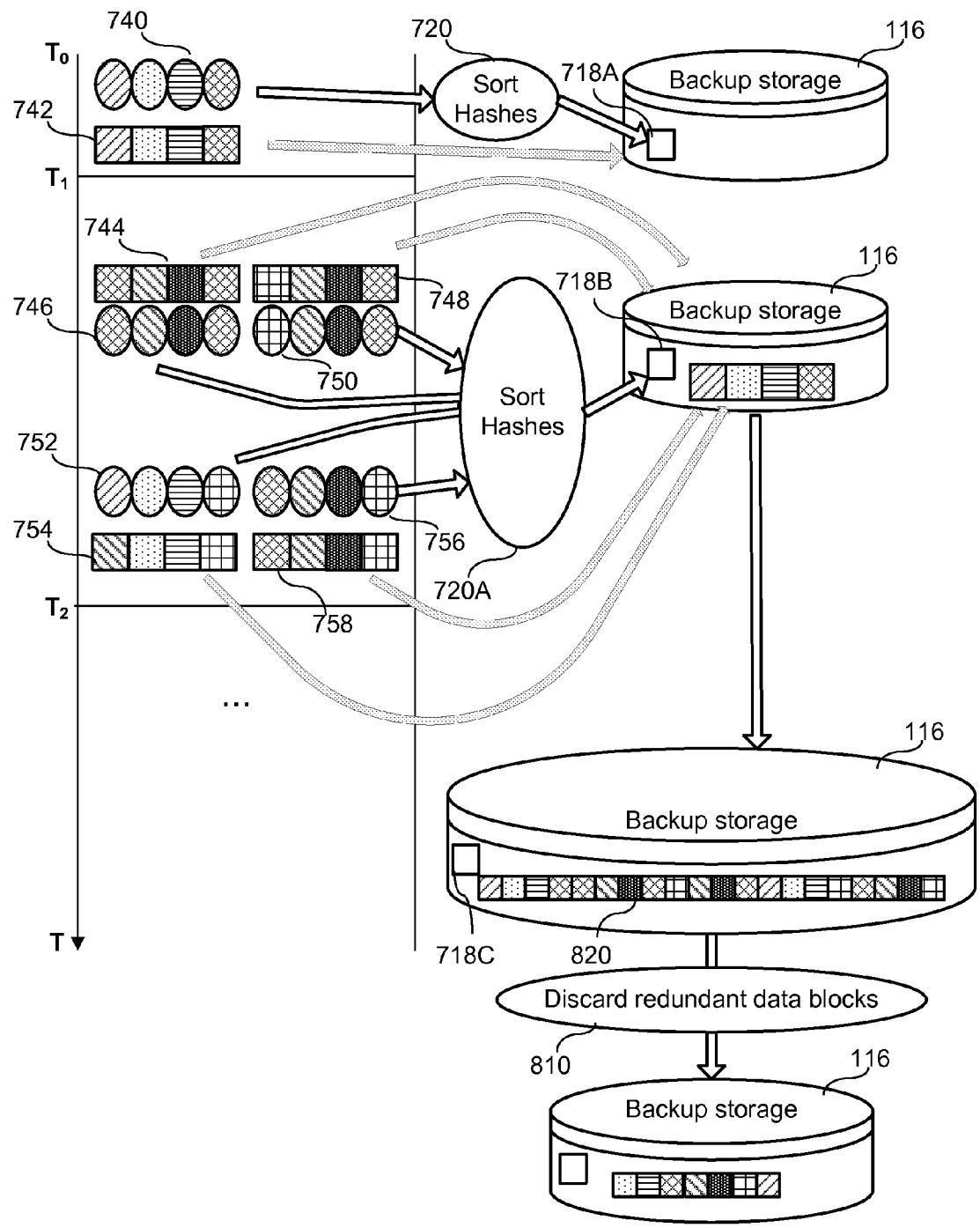
FIG. 8 illustrates a hashing scheme that uses sorting of hash values in a hash-table where the hash-table is filled up during backup of data having identical data blocks (i.e. hash values) with a subsequent deletion of the same data blocks, in accordance with the exemplary embodiment.

FIG. 8 illustrates a hashing scheme that uses sorting of hash values in a hash-table where the hash-table is filled up during backup of data having identical data blocks (i.e. hash values) with a subsequent deletion of the same data blocks, in accordance with the exemplary embodiment.

FIG. 8 depicts a situation similar to the one shown in FIG. 6 with added hash sorting operation—720 and 720A. In this case, all data blocks 742, 744, 748, 754 and 758 are backed up onto a backup storage, and only unique hash values 718A, 718B, 718C and corresponding unique pointers to the backed up blocks 820 are stored.

The exemplary hash values are compared during the time between $T_1$ and $T_2$ when a backup request for the data blocks 744, 748, 754 and 758 is received. These data blocks can belong to different hard disks, different partitions or volumes, or to different computer systems, etc. After receiving a backup request, the system backs up the data blocks 742, 744, 748, 754 and 758 into the backup storage 116 and sorts out the hash values as described above.

Note that backup of the data blocks 742, 744, 748, 754 and 758 onto the data storage 116 and sorting of hash values 746, 750, 752, 756 can be performed in parallel or sequentially. After sorting of the hash values, the hash values 746, 750, 752, 756 are placed sequentially one after another.

Alternatively, the hash values can be sorted out according to a certain criteria, for example, by three, four, etc. last bits of the hash value.

In case when the data blocks 746, 750, 752, 756 subject to the backup are identical (i.e., have coincident corresponding hashes), after the sorting the same hash values are listed one after another. Comparison of hashes can be performed after the sorting operation (see block 1020 in FIG. 10). The hash values can be compared against the hash tables 718A, 718B and 718C for detecting only unique hash values.

Figure 9:
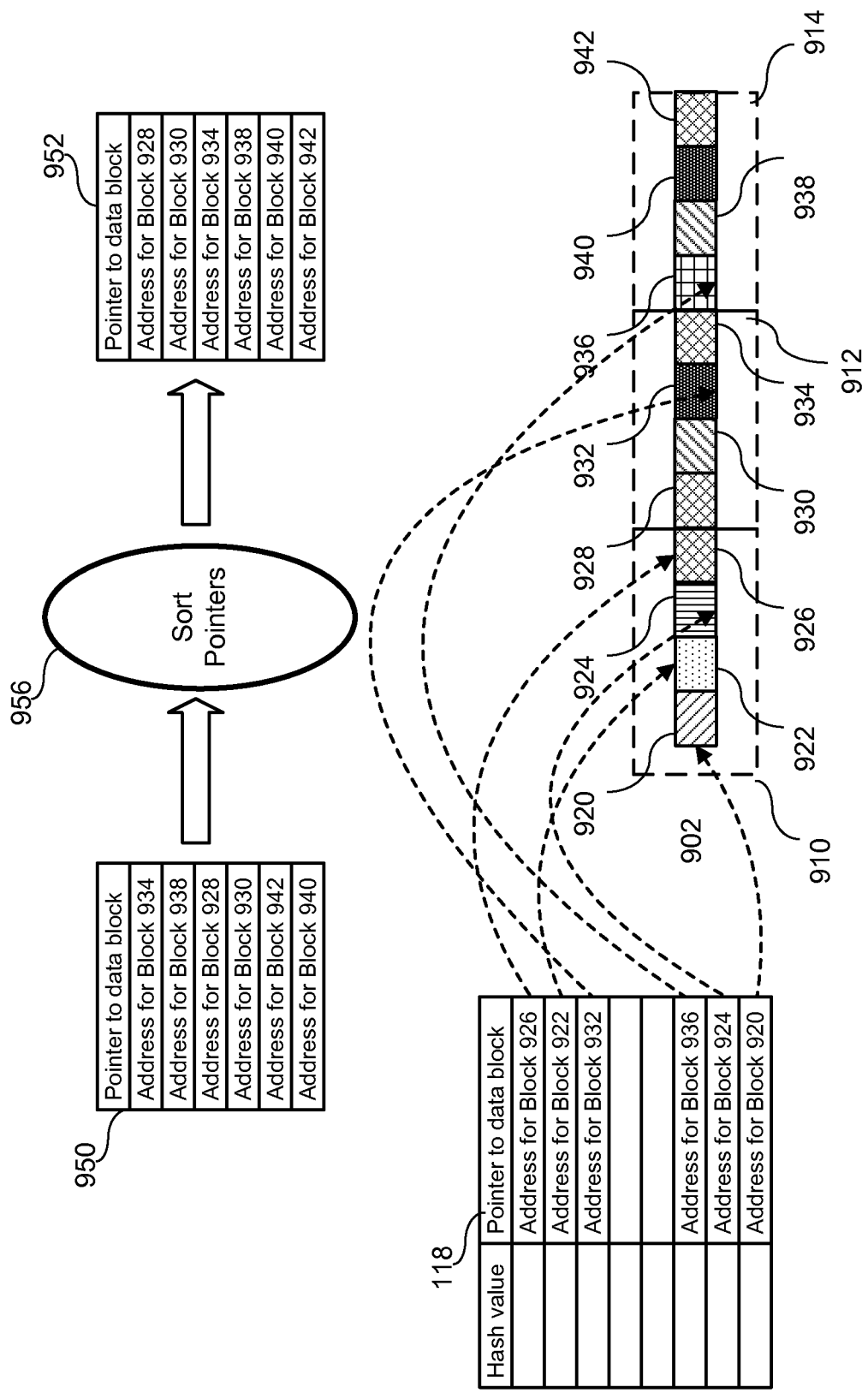
FIG. 9 illustrates sorting of hash values according to pointers, in accordance with the exemplary embodiment.

Thus, only the unique hash values (and unique location pointers) are written into the hash table. Detected redundant hashes are not considered. However, the pointers to the redundant data blocks, such as 410A and 418A in FIG. 4 can be stored into a file or a table 950 (FIG. 9). Subsequently, deletion 810 of the redundant data blocks from the data storage 116 is performed. According to the exemplary embodiment, the deletion can be performed based on a user request, at the moment of a least load or free time of the backup server, or after a certain time interval.

The saved location pointers referring to the redundant data blocks can be sorted (956 in FIG. 9) in the same file, table, list or system operating memory. After sorting the pointers (or in parallel with it), the backup is divided into virtual containers 910, 912, 914 of an arbitrary size as shown in FIG. 9. For example, a size of a container can be set as a square root of the entire backup size or of a maximum size of the backup file, or as a function of these values (or other backup properties), size of the media storage, size of the backup storage, estimated size of the backup, maximum size of the backup file, etc.

Alternatively, the container size can be set by a constant value. For example, one container can contain 1000 or 10000 data blocks (such as 210, 212 and 214 in FIG. 3). After sorting of the pointers 956 a number of redundant data blocks 928, 930, 934, 938, 940, 942 can be determined (that do not have location pointers in the hash table) located in a particular container.

It should be noted that if the container has few duplicate blocks (compared to unique blocks), then the container does not need to be deleted. If the container has many duplicate and few unique blocks, then the container should be deleted. For example, $z=x/y$, where x—number of duplicate blocks, y—number of unique blocks. Then if $z>A$, then the container is deleted, if $z<A$, then the container is not deleted, where A can be any number greater than zero. If $y=0$, then the container is deleted.

The size of the container can also be changed after analyzing at least one container. For example, if the condition is set as $z>30$ (i.e., $A=30$), and in fact, $A=20$, then in addition to the condition $z>A$ or $z<A$, an addition condition can be applied, for example, if $z<30$, but $z>19$, then the size of the containers is changed, i.e., the backup is broken up into containers of larger or smaller size. The containers, therefore, will have more or fewer blocks. IF $z<30$ but $z>19$, then the number of blocks in the virtual containers can be increased by, e.g., 100, or by some number that is a function of the size of the backup, or the size of the original container.

For example, container 910 does not have any redundant blocks, since the table of sorted pointers 952 does not have any pointers to the data blocks belonging to the container 910. Container 912 has three redundant data blocks 928, 930 and 934 that can be deleted. Likewise, container 914 has redundant data blocks 938, 940, 942.

Note that a number of redundant blocks within a container can be determined. A condition can be set for making a decision for deleting or keeping the redundant blocks in the container. For example, a ratio (or percentage) of used data blocks to redundant (unused) data blocks can be calculated. Then, if a number of the redundant blocks in the container is less than 5-10% of all used blocks, the redundant blocks can be removed from the container. Alternatively, a ratio of a number of the redundant blocks to a size of the container or to the size of the entire backup can be used.

Also, if a container has a small number of the redundant blocks (i.e., a deletion criteria is not satisfied), the deletion criteria can be changed or a size of the container can be reduced. After this, the used blocks (i.e., the blocks having corresponding pointers in the hash table) can be read out of the container into an operating memory or copied onto the backup storage 116. Then, the read blocks are written into the backup and the pointers are changed accordingly. The pointers are changed to refer to new locations of the stored blocks in the backup. Then the original container (i.e., the container from which the blocks have been read out) is deleted.

Alternatively, the entire container can be read out or copied. The unused data blocks are deleted. The remaining data blocks are written into the backup and the corresponding pointers are changed in the hash table. Then the original container (i.e., the container that has been entirely read out or copied) is deleted. Note that sorting of pointers and splitting back up into containers are optional.

Note that the hash tables 718A, 718B, 718C can be represented by the same table. New hash values can be added to this table along with the location pointers to the backed up blocks 820. The calculated hash values 740, 746, 750, 752 and 756 for the data blocks 742, 746, 750, 754 and 758 that are subject to backup, are written into the hash tables 718, 718A, 718B after being sorted out. Then, the hash values are compared to the hash values corresponding the backed up blocks for determining uniqueness of the corresponding data blocks.

However, the calculated hash values 740, 746, 750, 752 and 756 can be first compared against the hash values corresponding to the backed up blocks from the hash table and then sorted out.

Note that a common situation is that the image is stored on a drive that is physically different from the disk drive that is being backed up. A drive on which the image of the disk is created can be physically the same drive, a partition of the drive, a logical drive, a network drive, a distributed storage system, etc.

The exemplary embodiment can optionally use an additional step of checking block content coincidence (i.e., matching), since the hash values do not always provide 100% reliable information. In the process of storing data in the backup storage, the backup storage can contain two types of data:

1. Block identifier and contents of a corresponding block.
2. Block identifier and a pointer or an identifier of a block containing actual data, such as a pointer to a block with the same contents and same hash value.

In this case, an indicator or an extra bit in the bitmap can be used to define whether the backup storage contains the actual contents or the pointer. The size of the corresponding data can be used as the indicator, since all pointers contain a similar number of bytes and preferably have an equal size.

Figure 10:
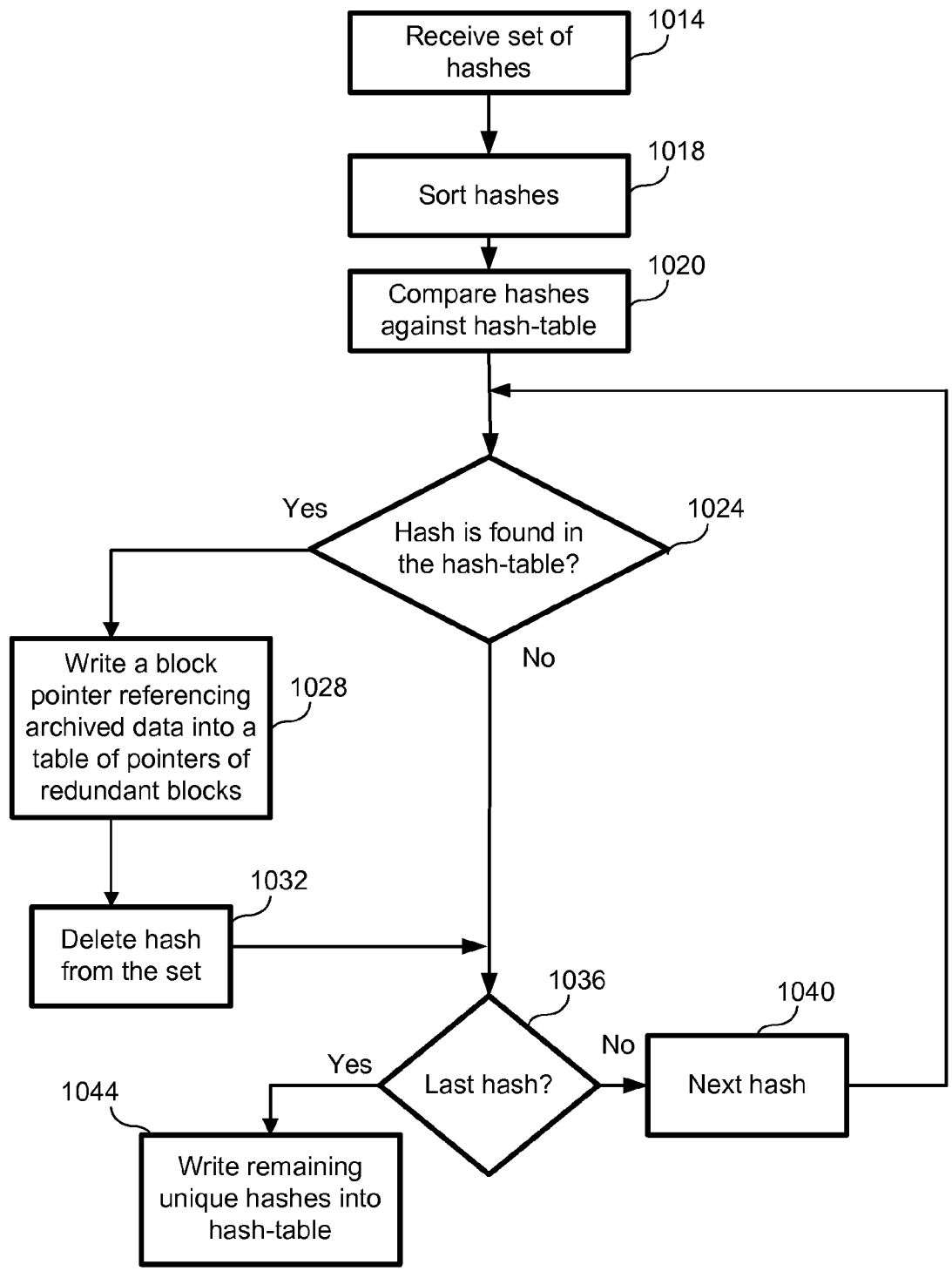
FIG. 10 illustrates a method for finding the unique hash values, in accordance with the exemplary embodiment.

FIG. 10 illustrates a method for finding unique hash values, in accordance with the exemplary embodiment. After a number of hashes are accumulated on a backup server in step 1014, these hashes are sorted in step 1018. Then, in step 1024, the hashes are compared against the hash values in the hash table. If a hash matches the hash from the hash table, in step 1028 a pointer to the block in the archive is written to the table of pointers to the redundant blocks.

Then, in step 1032, the hash value is deleted from a set of the hash values. In step 1036 a system checks if the hash is the last in the group. If the hash is the last in the group, in step 1044, the remaining unique hash values are written into the hash table. If it is determined, in step 1036, that the hash value is not the last one in the group, in step 1040 the next hash is selected from the group. If in step 1024 hash does not match any hashes from the table, i.e. the hash is unique, the process moves to step 1036.

Those skilled in the art will appreciate that the exemplary embodiment provides efficient method of data back where redundant data is detected and not stored.

It should be noted that in some cases the same hash values may correspond to blocks with different contents. According to the exemplary embodiment only one block is reflected in hash table and all other blocks with the same hash value but different contents are also stored in subsequent backup sets, even if some of those blocks coincide with each other.

Figure 11:
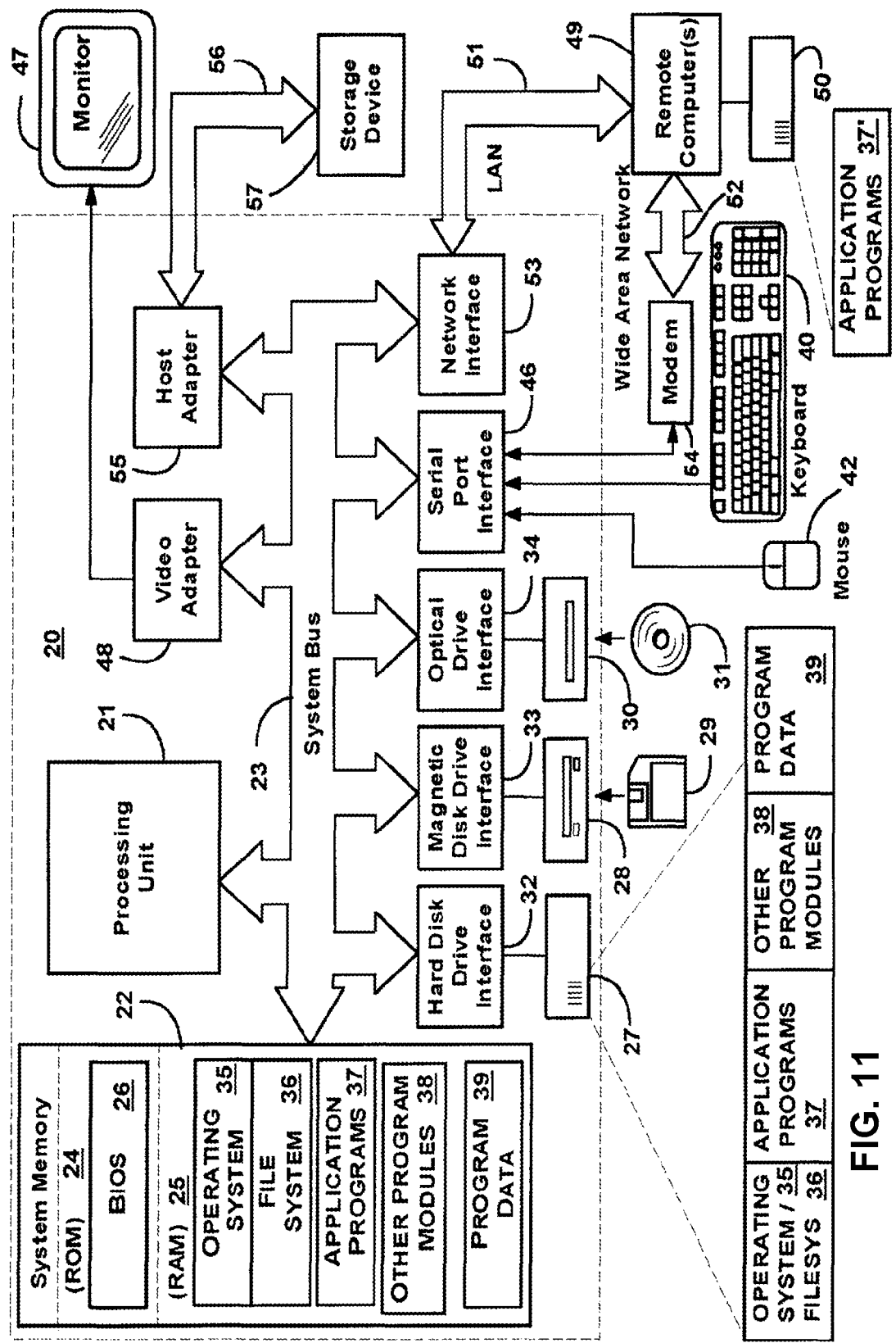
FIG. 11 illustrates an example of a computer system that may be used for implementing the invention.

With reference to FIG. 11, an exemplary system for implementing the invention includes a general purpose computing device in the form of a computer or a server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed method provides for an effective backup of data that takes into account the redundancy of backed up data.

It should also be appreciated that various modifications, adaptations and alternative embodiments thereof may be made within the scope and spirit of the present invention. The invention is further defined by the following claims.

What is claimed is:

1. A method for data backup, the method comprising:
determining a set of data blocks subject to a backup;
for each data block generating a hash value and a location pointer;
accumulating the hash values into a set;
sorting the hash values within the set;
comparing the hash values against hash values stored in a hash table, wherein the hash values stored in the hash table correspond to previously backed up unique data blocks;
storing location pointers of the data blocks, if the corresponding hash values match the hash values from the hash table;
deleting the matching hash value from the set;
writing remaining unique hash values into the hash table; and identifying redundant data block locations of data blocks in the backup data storage that are absent from the hash table;

dividing the backup data storage into containers;

determining a number of redundant data blocks in each container; and determining whether to delete a redundant data block based on a ratio of the number of redundant data blocks in a corresponding container to the number of used data blocks in the corresponding container.

2. The method of claim 1, further comprising deleting redundant data blocks using the location pointers.

3. The method of claim 1, wherein the data blocks are backed up to different data storages.

4. The method of claim 1, wherein the hash values are generated using any of hash function MD4, MD5, CRC, CRC32, SHA1, SHA2, SHA512, SHA256, GOST, hash function based on block ciphers and Message Authentication Code (MAC).

5. The method of claim 1, wherein the location pointers are stored in the hash table.

6. The method of claim 1, wherein the hash values are sorted after being compared to the stored hash values from the hash table.

7. The method of claim 1, further comprising sorting the location pointers.

8. The method of claim 1, wherein the hash values are sorted according to their addresses.

9. The method of claim 1, wherein the hash values are sorted sequentially.

10. The method of claim 1, wherein the hash values are sorted based on a set number of last bits of each of the hash values.

11. The method of claim 1, wherein the hash values are sorted in parallel with the backup of the data blocks onto the backup storage.

12. A system for data backup, the system comprising:

a set of data blocks located on a storage media subject to a backup;

a backup storage for backup of the data blocks;

a module for generating hash values of the data blocks;

location pointers corresponding to the data blocks;

a hash table for storing the location pointers and hash values corresponding to the data blocks, wherein:

the hash values are sorted and compared against the hash values from the hash table corresponding to previously backed up data blocks;

the location pointers of the data blocks are stored, if the hash values match the hash values corresponding to the previously backed up data blocks;

the matching hash values are deleted and remaining unique hash values are stored into the hash table;

the data blocks corresponding to the unique hash values are backed up to the backup storage;

redundant data block locations of data blocks in the backup data storage that are absent from the hash table are identified;

the backup data storage is divided into containers;

a number of redundant data blocks in each container is determined; and whether to delete a redundant data block is determined based on a ratio of the number of redundant data blocks in a corresponding container to the number of used data blocks in the corresponding container.

13. The system of claim 12, wherein the hash values are sorted according to any of:

sequential order;

hash value addresses; and a set number of last bits.

14. A system for data backup comprising:

a processor;

a memory couple to the processor;

a computer program logic stored on the memory and executed on the processor, the computer program logic for implementing the steps of claim 1.

\* \* \* \* \*